Oct. 31, 1961     M. B. RICHARDSON     3,006,353
CAMP GEAR STRUCTURE
Filed March 28, 1960     3 Sheets-Sheet 1
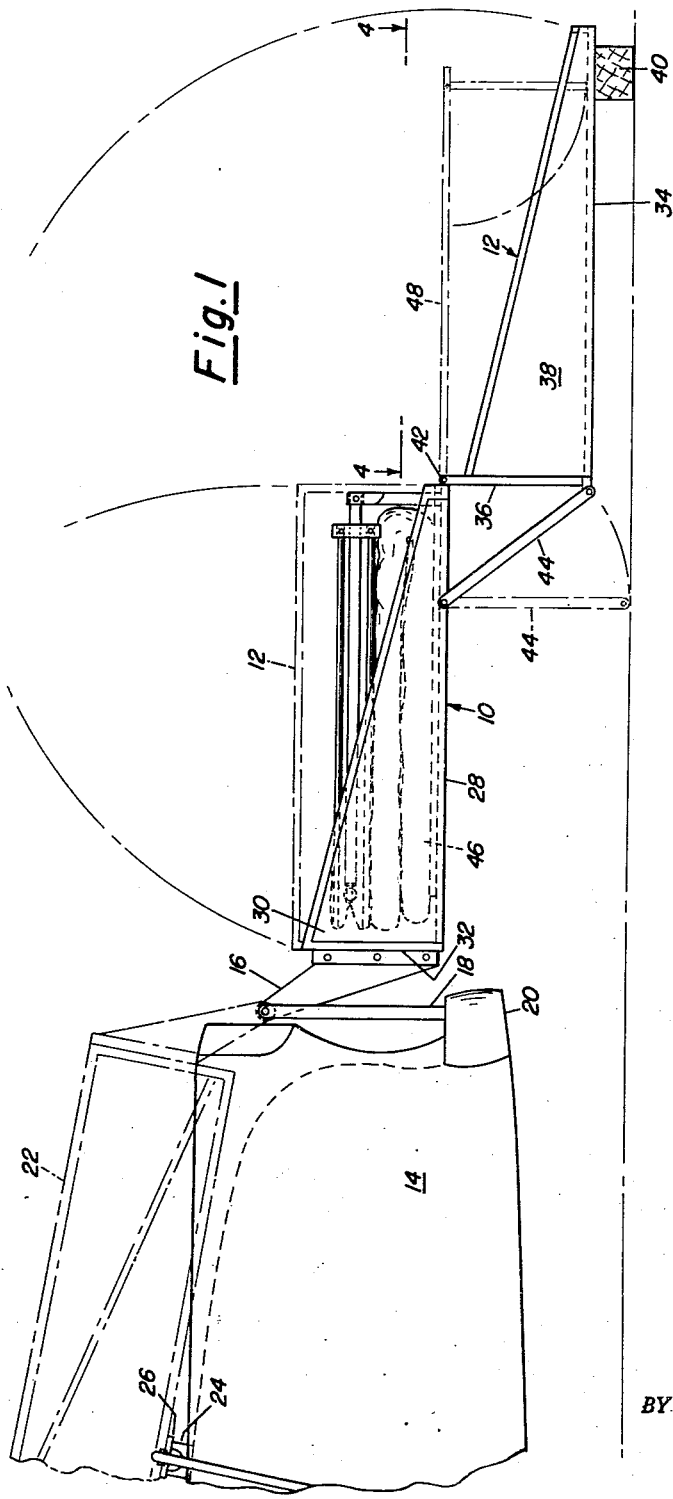
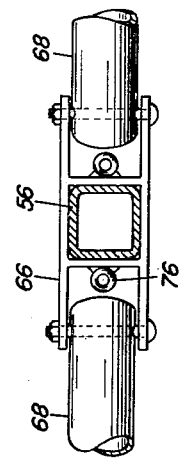
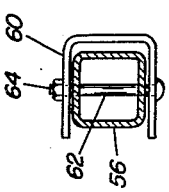
INVENTOR.
MORGAN B. RICHARDSON
BY Fulwider, Mattingly
& Huntley
ATTORNEY Oct. 31, 1961 — M. B. RICHARDSON — 3,006,353
CAMP GEAR STRUCTURE Filed March 28, 1960 — 3 Sheets-Sheet 2

INVENTOR.
MORGAN B. RICHARDSON
BY *Fulwider, Mattingly & Huntley*
ATTORNEY

Oct. 31, 1961 M. B. RICHARDSON 3,006,353
CAMP GEAR STRUCTURE
Filed March 28, 1960 3 Sheets-Sheet 3

INVENTOR.
MORGAN B. RICHARDSON
BY
ATTORNEY

United States Patent Office 3,006,353
Patented Oct. 31, 1961

3,006,353
CAMP GEAR STRUCTURE
Morgan B. Richardson, 5330 Valle Vista Drive,
La Mesa, Calif.
Filed Mar. 28, 1960, Ser. No. 17,979
5 Claims. (Cl. 135—4)

The present invention relates to a camp gear structure and more particularly to a camp gear structure for automatically deploying a canopy upon opening of the structure.

According to the present invention, there is provided a camp gear structure which is relatively light and compact so that it may be carried in or by a motor vehicle. The structure comprises a pair of hinged parts, one of which is adapted for connection to the motor vehicle, while the other part is adapted to be supported above the ground by a pair of corner supports. However, the structure may be separately supported from the motor vehicle if desired, and may be constructed as part of a trailer which can be towed by the motor vehicle. In the preferred embodiment of the present invention, the structure is pivotally carried at the rear end of the motor vehicle so that it may be swung into position upon the trunk deck area of the vehicle so that the motor vehicle wholly supports the structure.

The pair of hinged parts are arranged to mate in their closed positions to form a closed box or container for housing the other components of the structure. In their open position the two hinged parts provide a two level floor arrangement, and beds are fitted to the parts to provide sleeping accommodations. As will be seen, the beds are so designed that they may also serve as seats or tables, depending upon the desires of the campers.

A weather-tight tent covering or canopy is provided to protect the campers from the elements, and this canopy is self-erecting by the provision of unique means which afford full and adequate head room in the open position of the hinged parts, and which are completely stowable within the container formed by the hinged parts when these parts are in their closed position.

More particularly, the camp gear structure includes a pair of posts or columns which are pivotally carried adjacent their inner ends by the hinged part which is normally supported by the rear end of the motor vehicle. Each of these columns carries a bracket which is slidable along the length of the column. The brackets each pivotally carry a pair of elongated bow members which are swingable toward the associated column for stowage in the closed position of the hinged parts, and swingable away from the column for deploying a canopy which is carried at the outer ends of the bow members. A line, rope, or cord or the like is fixed at one end to the hinged part which is closely adjacent to the ground, and this line is trained through a suitable pulley attached to the outer end of one of the posts. The other end of the cord is fixed to the slidable bracket of that post. A similar line is disposed through a suitable pulley mounted at the outer end of the other post, and is secured to the bracket of that post. With this arrangement, when the hinged parts are in their closed position, the pivotal movement of one of the hinged parts toward the open position causes the slack to be taken out of these lines, and the action of the lines on the pulleys of the posts will urge the posts into a substantially vertical position. Thereafter, continued pivotal opening movement of the hinged part will cause the lines to pull the slidable brackets upwardly or outwardly upon the posts and deploy the bow elements outwardly. The upward extension of the bow elements, together with the erection of the posts, arranges the canopy in the desired position for shelter of the campers.

This unique slidable upward movement of the bow means insures adequate head room for the campers, even though the posts employed are much shorter than what would be required for adequate head room if the posts themselves supported the canopy. Thus, the bow elements extend upwardly to provide ample head room, while the posts are short enough to be stowable within the container formed by the hinged parts in their closed position.

An additional pair of lines are secured to the hinged part which is carried immediately adjacent to the motor vehicle, and the other ends of these lines are secured to the outer end of the posts to limit the pivotal opening movement of the posts so that the posts cannot travel beyond a substantially vertical position. In addition, the unique sequence of initial erection of the posts and subsequent upward travel of the bow elements insures that the bow elements will not become entangled with other components of the present camp gear structure.

Other objects and features of the present invention will be readily apparent to those skilled in the art from the following specification and appended drawings wherein is illustrated a preferred form of the invention, and in which:

FIGURE 1 is a side elevational view of a camp gear structure according to the present invention, the hinged parts being shown in their open position, while the posts and bow elements are shown in their closed position for convenience, it being understood that normally in the open position of the hinged parts the posts and bow elements will also be in their open positions;

FIGURE 5 is a detail plan view, partially in cross section, illustrating the pivotal connection at the inner end of one of the posts;

FIGURE 6 is a detail plan view, partially in cross section, illustrating the manner of connection of the inner ends of the bow elements to the bracket of one of the posts.

Figure 2:
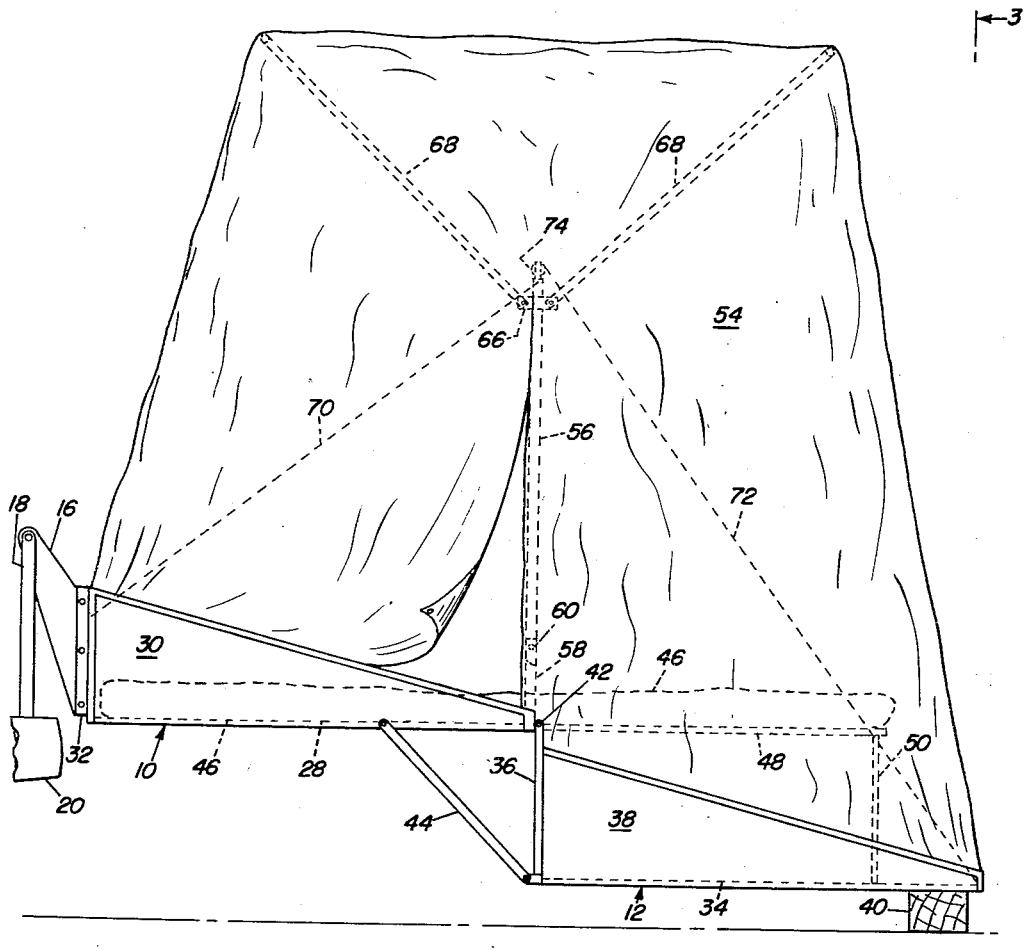
FIGURE 2 is a side elevational view similar to FIGURE 1, but showing both the hinged parts and also the posts and bow elements in their open positions, a canopy also being illustrated in its deployed position.

Referring now to the drawings, and particularly FIGURES 1 and 2 thereof, there is illustrated a camp gear structure according to the present invention which comprises, generally, a pair of parts 10 and 12 which are relatively pivotable with respect to each other from a closed position, which is indicated in phantom outline in FIGURE 1, to an open position, which is illustrated in full lines. Parts 10 and 12 closely mate in their closed positions to form a box-like enclosure or container which is carried at the rear end of a motor vehicle 14. A support arm 16 is fixedly secured to the forward end of bottom part 10, and is also pivotally secured to a suitable hitch 18 which is rigidly carried by vehicle 14 in any suitable manner, such as at the bumper 20 of vehicle 14. With this arrangement the box-like enclosure formed by parts 10 and 12 in their closed positions may be pivoted upwardly and forwardly to the position indicated at 22 upon the trunk-deck area of motor vehicle 14. In this position the present camp gear structure is supported by resilient cushioning elements 24 which are in turn carried by an element 26 which is transversely disposed across the trunk-deck area. The relatively small and compact nature of the present camp gear structure is thus easily adapted for carriage by a motor vehicle in the manner illustrated. However, it will be understood that if desired the present camp gear structure could be separately mounted as part of a trailer hitched to the motor vehicle and, further, the structure could easily be stowed within a station wagon type of motor vehicle. The single connection of the structure to motor vehicle 14 in the embodiment illustrated permits the structure to be easily detached for separate use independently of motor vehicle 14. That is, any suitable support may be arranged under bottom part 10 to space it above the ground in the manner illustrated in FIGURE 1.

The bottom part 10 includes a bottom panel 28 and spaced apart side walls 30, and a forward end wall 32, side walls 30 being inclined rearwardly so as to have their minimum height at the rearward end of bottom part 10. Top part 12 includes a top panel 34, a rearward end wall 36, and a pair of spaced apart side walls 38 which are inclined rearwardly at an angle such that when parts 10 and 12 are mated in their closed positions, side walls 30 and 38 will abut at their edges. In the open positions of parts 10 and 12, side walls 38 substantially form a continuation of side walls 30, top panel 34 serving as a floor in this open position. Top panel 34 is substantially parallel to the ground by reason of supports 40 which are placed under top part 12 at the extreme end thereof. By adjusting the size of supports 40 clearance is provided between top part 12 and the ground, and compensation is made for uneven terrain. Top part 12 is hingably secured to bottom part 10 by a continuous piano hinge 42, which extends transversely across the width of parts 10 and 12, and additionally by pin hinged connections (not shown) in essentially the plane of the side walls 30 and 38 on opposite sides of the camp gear structure. In addition, a dual purpose support leg or locking brace 44 is pivotally secured to bottom part 10 and normally secured to top part 12, as illustrated, when top part 12 has been pivoted to its open position. However, locking brace 44 also serves to support parts 10 and 12 when they have been rotated from the position indicated at 22 to a substantially horizontal position behind motor vehicle 14. More particularly, brace 44 is first located in the position indicated in phantom lines, and, after supports 40 have been positioned under top part 12, brace 44 is then pivoted to the full line position and secured to top part 12 to rigidly fix parts 10 and 12 with respect to each other in the opened condition. Parts 10 and 12 are thus locked by brace 44 to maintain the parts in fixed, opened position.

Figure 3:
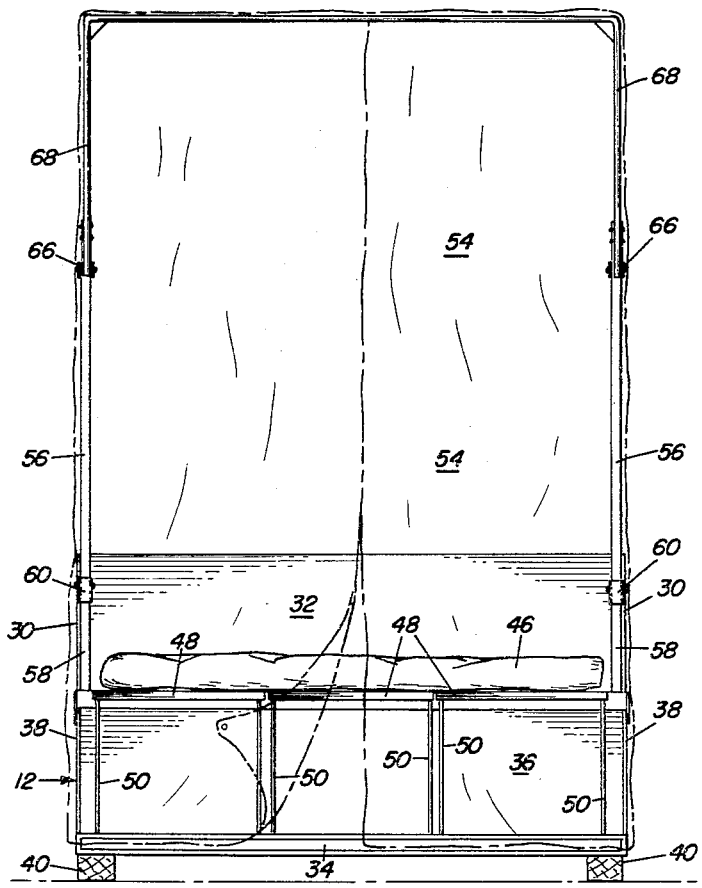
FIGURE 3 is an end elevational view taken along line 3—3 of FIGURE 2.
Figure 4:
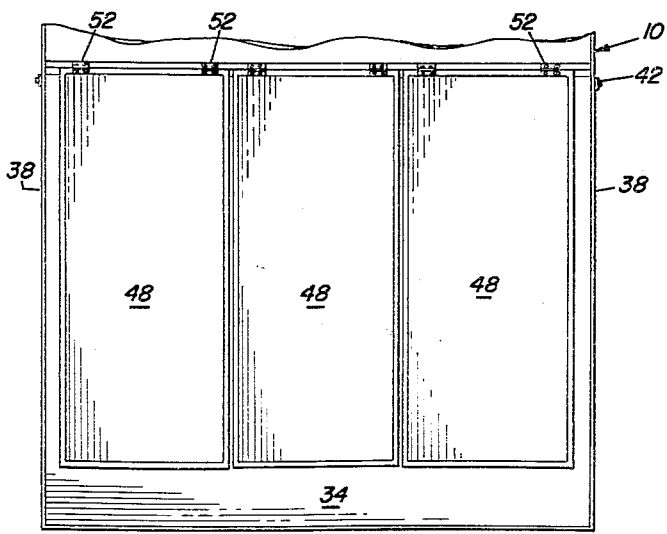
FIGURE 4 is a partial plan view taken along line 4—4 of FIGURE 1.

FIGURE 1 illustrates the manner in which bedding 46 may be housed within the enclosure formed by parts 10 and 12 when they are in their closed position. After top part 12 has been opened, bedding 46 may be unfolded, and a plurality of extensions 48 fitted in position to support the extended end of bedding 46. As best illustrated in FIGURES 3 and 4, extensions 48 are rigid panels which are supported by legs 50 resting upon top panel 34. The ends of extensions 48 opposite legs 50 are fitted with any suitable securing means 52 for detachable connection to bottom panel 28 of bottom part 10. In FIGURES 3 and 4 three of these extensions 48 are provided to support bedding 46 to accommodate two persons, although it will be apparent that fewer extensions may be employed if it is decided to use the area for other purposes. Extensions 48 may easily be stored in the compartment formed by parts 10 and 12 in their closed positions.

Shelter from the elements is provided by a tent-like cover or canopy 54, which is best illustrated in FIGURE 2. Canopy 54 is in continuous attachment with parts 10 and 12 along the lower end margins of canopy 54. With this arrangement, canopy 54 may be collapsed and fitted within the enclosure formed by the closed parts 10 and 12, as will be seen.

Next will be described the means for automatically erecting canopy 54 upon pivotal movement of top part 12 to its open position. Elongated supports, columns, or posts 56, one located at either side of bottom part 10, are pivotally carried adjacent their inner ends by short elements 58 which are rigidly secured to bottom panel 28 of bottom part 10. This pivotal connection is best illustrated in FIGURE 5 and comprises a U-shaped bracket 60 which is fitted about the abutting ends of posts 56 and elements 58. The pair of brackets 60 are secured to elements 58 in any suitable fashion, and a bolt 62 is disposed through each bracket 60 and the lower end of each post 56 to afford pivotal movement of posts 56. A nut 64 is provided to fix bolt 62 in position. The pivotal connections of posts 56 permit posts 56 to pivot through substantially ninety degrees when top part 12 is pivoted through substantially 180 degrees, the arcs of movement of posts 56 and top part 12 being substantially parallel.

As best illustrated in FIGURE 6, each post 56 slidably carries a bracket 66, bracket 66 being movable along the length of its associated post 56. Each bracket 66 pivotally carries the lower ends of a pair of bow members 68, each of these bow members 68 being U-shaped in configuration so that each bow member 68 extends upwardly or outwardly and thence transversely across the width of the camp structure and inwardly or downwardly to pivoted connection with the oppositely disposed bracket 66. Canopy 54 is secured to the transverse portions of bow members 68 and is movable therewith, as will be seen. The pivotal arrangement of bow members 68 permits them to pivot inwardly toward posts 56 for stowage when parts 10 and 12 are moved into their closed positions. Bow members 68 are pivotable outwardly and away from posts 56 for deployment of canopy 54 when parts 10 and 12 are arranged in their open positions.

A line, rope, or cord 70 is secured at one end to end wall 32 of bottom part 10, and is secured at its other end to the upper or outer end of one of the posts 56. A similar line 70 is secured in analogous fashion to the other post 56. Lines 70 serve to limit the pivotal opening movement of posts 56 to approximately 90 degrees so that posts 56 cannot move beyond a substantially vertical position.

Figure 7:
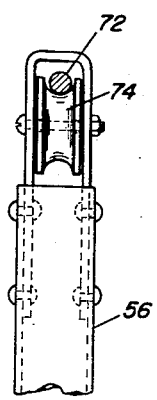
FIGURE 7 is a detail view in elevation of the pulley mounted at the outer end of one of the posts.

Another pair of cords 72 are secured at one end to the rearward or free end of top part 12, as viewed in the opened position, and are trained through a pair of pulleys 74 which are suitably connected at the upper or outer end of posts 56, as best illustrated in FIGURE 7. After passing about pulleys 74, each of the cords 72 is secured at its other end to an eye 76, FIGURE 6, of bracket 66. With this arrangement, when top part 12 is pivoted toward its open position, the slack will first be taken out of cords 72, and thereafter posts 56 will be pivoted to a substantially vertical position, and thereafter the continued opening movement of top part 12 will cause cords 72 to urge the pair of brackets 66 to the upper or outward position illustrated in FIGURE 2 in dotted outline. As brackets 66 move to this upper position, the pairs of bow members 68 will pivot outwardly under the action of gravity and also by reason of their attachment to canopy 54, and canopy 54 will be deployed or extended as illustrated in FIGURE 2. This sequence of action has been provided in order that the elevation or raising of bow members 68 will not occur at a time when they might strike the end wall 32 of bottom part 10.

Thus, posts 56 and bows 68 may be made comparatively short for convenient stowage within parts 10 and 12, and yet adequate head room is provided within canopy 54 by reason of the elevation of canopy 54 by bow members 68.

The form of canopy 54 is not important to the present invention, and may include customary openings for entry and egress, and ventilation.

Thus it will be seen that the present invention provides a light and compact camp gear structure which is adapted to deploy a canopy 54 quickly and easily to afford an enclosure having adequate head room for use by campers. Further, the camp gear structure is collapsible upon pivotal closure movement of top part 12, the posts 56, bow members 68, and canopy 54 automatically collapsing, as best illustrated in FIGURE 1, for convenient stowage within the compartment formed by the closed parts 10 and 12.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

I claim:

1. A camp gear structure comprising a pair of parts relatively pivotable from a closed position to an open position; elongated support means pivotally carried adjacent the inner end thereof by one of said parts; bow means slidably carried by said support means and effective to support a canopy; elongated means fixed at one end to one of said parts, in engagement with said support means adjacent the outer end of said support means, and fixed at the opposite end thereof to said bow means to thereby first pivot said support means to a substantially vertical position and thereafter slidably urge said bow means toward the outer end of said support means to deploy the canopy to its operative position when said hinged parts are pivoted to said open position; and means operative to maintain said support means in said substantially vertical position.

2. A camp gear structure comprising hinged top and bottom parts which mate in a closed position to define a closed container, said top part being pivotable through an opening arc of substantially 180 degrees to an open position; elongated posts pivotally carried adjacent their inner ends at opposite sides of said bottom part, and pivotable in an arc substantially parallel to said opening arc; a pair of brackets, one carried by each of said posts for slidable travel along the longitudinal axis of each said post; two pairs of outwardly extending elongated bow members, each of said pairs being connected adjacent their inner ends to one of said brackets for pivotal movement toward and away from the associated one of said posts; a canopy adapted to be supported in operative position by said pairs of bow members; a pair of elongated means each of which are fixed at one end to said top part, in engagement with one of said posts adjacent the outer end thereof, and fixed at the opposite end thereof to one of said brackets to thereby first pivot said posts to a substantially vertical position and thereafter slidably urge said brackets toward the outer ends of said posts to pivot said bow members outwardly to deploy said canopy to its operative position when said top part is pivoted to said open position; and means connected to said posts and said bottom part to limit the pivotal travel of said posts.

3. A camp gear structure comprising hinged top and bottom parts which mate in a closed position to define a closed container, said top part being pivotable through substantially 180 degrees to an open position, elongated support means pivotally carried adjacent the inner end thereof by said bottom part, elongated bow means slidably carried adjacent the inner end thereof by said support means, a canopy attached to said top and bottom parts and supported by said bow means adjacent the outer end thereof for deploying said canopy when said top part is pivoted to said open position, said support means and said canopy being located as to be carried interiorly of said closed container when said parts are in said closed position, elongated means fixed at one end to said top part, in engagement with said support means adjacent the outer end of said support means, and fixed at the opposite end thereof to said bow means to thereby first pivot said support means to a substantially vertical position and thereafter slidably urge said bow means toward the outer end of said support means when said top part is pivoted to said open position, and means operative to maintain said support means in said substantially vertical position.

4. A camp gear structure comprising a closed container, said closed container comprising a pair of parts relatively pivotable from a closed position to an open position, a pair of elongated elements pivotally carried adjacent the inner ends thereof and at opposite sides of one of said parts, a pair of bow means slidably carried by said elongated elements, one for each of said elongated elements, said pair of bow means serving to support a canopy, said bow means including an integral, transversely disposed section connecting together said pair of bow means to provide common pivotal movement of both of said pair of bow means, elongated means fixed at one of their ends to one of said parts, in engagement with each of said elongated elements adjacent the outer ends of said elongated elements, and fixed at their opposite ends to said pair of bow means to thereby first pivot said elongated elements to a substantially vertical position and thereafter slidably urge said bow means toward the outer ends of said elongated elements to deploy the canopy when said pair of parts are pivoted to open position, and means operative to limit the pivotal travel of said elongated elements.

5. A camp gear structure comprising hinged top and bottom parts which mate in a closed position to define a closed container, said top part being pivotable through an opening arc of substantially 180 degrees to an open position; elongated posts pivotally carried adjacent their inner ends at opposite sides of said bottom part, and pivotable in an arc substantially parallel to said opening arc; a pair of brackets, one carried by each of said posts for slidable travel along the longitudinal axis of each said post; a plurality of outwardly extending, generally U-shaped bow members, each of said bow members being connected adjacent its inner ends to said brackets for pivotal movement, a canopy connected to said top and bottom parts and supported by said plurality of bow means adjacent the outer ends thereof for deploying said canopy upon pivotal movement of said top part to said open position, said posts, said bow members, and said canopy being pivotable to positions completely within said closed container when said top part is pivoted to said closed position, a pair of pulleys, one mounted adjacent the outer end of each of said posts, a pair of elongated means each of which is fixed at one end to said top part, trained about one of said pulleys, and fixed at the opposite end thereof to one of said brackets to thereby first pivot said posts to a substantially vertical position and thereafter slidably urge said brackets toward the outer ends of said posts to move said bow means to deploy said canopy when said top part is pivoted to said open position; and means connected to said posts and said bottom part to limit the pivotal travel of said posts.

References Cited in the file of this patent

UNITED STATES PATENTS

| | | |
|---|---|---|
| 1,576,942 | Beebe | Mar. 16, 1926 |
| 2,706,993 | Forrest | Apr. 26, 1955 |
| 2,937,651 | Van Tassel | May 24, 1960 |

OTHER REFERENCES

Article in Popular Science Magazine entitled "How Trailer Is Designed To Provide Split-Level Living," page 167, June 1955 issue.